United States Patent [19]
Lovitt et al.

[11] 3,948,497
[45] Apr. 6, 1976

[54] ENERGY ABSORBER

[75] Inventors: Thomas L. Lovitt, Huron; Thomas J. Lovitt, Sandusky; George W. Wight, Jr., Huron; Paschal P. Zapponi, Cleveland; John C. Wagner, Norwalk, all of Ohio

[73] Assignee: Gould Inc., Chicago, Ill.

[22] Filed: July 8, 1974

[21] Appl. No.: 486,386

[52] U.S. Cl. .................. 267/9 B; 188/1 B; 267/140
[51] Int. Cl.² .......................................... F16F 11/00
[58] Field of Search ........... 267/9 B, 140, 141, 9 R; 188/1 B

[56] References Cited
UNITED STATES PATENTS

| | | | |
|---|---|---|---|
| 3,323,814 | 6/1967 | Nickell | 188/1 B |
| 3,332,523 | 7/1967 | Chambers | 188/1 B |
| 3,696,891 | 10/1972 | Poe | 188/1 B |
| 3,718,326 | 2/1973 | Ristau | 267/140 |
| 3,799,531 | 3/1974 | Yamazaki | 267/140 |
| 3,952,462 | 8/1973 | Wight, Jr. | 267/140 |

Primary Examiner—James B. Marbert
Attorney, Agent, or Firm—Edward E. Sachs

[57] ABSTRACT

A method and an apparatus for absorbing the energy of shock impact loads are disclosed. In accordance with the method, an elastomeric member is axially advanced along a friction surface and into a confined condition upon impact loading to simultaneously provide friction and resilient deformation reaction forces having a substantially constant additive total. The elastomeric member is preloaded in an axial direction and the friction interface developed is of controlled lubricity to assure efficient energy absorption and uniform reaction forces independent of temperature and impact velocity. If velocity sensitivity is desired, the friction surface and preload can be modified to provide direct velocity sensitivity wherein the reaction force increases with the velocity of the impact. The apparatus includes an impact receiving piston axially disposed within a casing and arranged to load the elastomeric member. The casing includes a restricted first portion which provides an elastomer engaging friction surface and an enlarged second portion into which the elastomeric member is advanced and resiliently deformed.

14 Claims, 8 Drawing Figures

ENERGY ABSORBER

The present invention relates to an apparatus and method for absorbing the energy of shock loads wherein an elastomeric member is used to provide multiple mode frictional dampening and spring shock absorbing characteristics. The elastomeric member is arranged within the shock absorber apparatus to resist loads by means of additive, simultaneous frictional and resilient deformation reaction forces having a substantially constant additive total through the stroke of the apparatus.

A constant reaction force device is desirable since it approaches the efficiency of a square wave force-deflection curve. In this manner, it assures that the maximum energy is absorbed within predetermined or tolerable reaction force and deflection values. The present invention provides a constant reaction force device wherein the force response is a substantially constant value which is independent of impact velocity and operating temperature.

In accordance with a further aspect of the invention, an impact velocity sensitive response is obtained by modifying the friction interface of the shock absorber and the preload conditions. In this instance, the efficiency of a square wave response and temperature independence are maintained but the reaction forces which are primarily generated by friction are directly proportional to the impact velocity through the desired range of operation.

The type of apparatus with which the subject invention is concerned is disclosed in U.S. Pat. No. 3,752,462 to Wight and U.S. Pat. No. 3,799,531 to Yamazaki et al. These prior art devices employ elastomeric members to provide reaction forces in multiple modes.

The use of multi-mode elastomeric shock absorbers has been heretofore limited by a number of undesirable operational characteristics. It is believed that the deficiencies of prior art devices primarily result from the failure to efficiently and fully employ the frictional reaction forces available in a multi-mode elastomeric device as well as to control the frictional reaction forces in order to provide predictable and reproducible results. A number of the prior art problems are briefly discussed below.

The prior art devices fail to provide acceptably uniform performance throughout a reasonably broad operating temperature range, and tend to reflect the expected substantial variations in the physical properties of elastomers with temperature. The performance variations in the resilient deformation mode due to temperature conditions are to be expected. With respect to the friction mode, the temperature problems have been due in part to the differences between the coefficients of thermal expansion of the elastomeric member and the cooperating friction surface structure of the shock absorber. The prior art devices tend to display erratic behavior upon changes in operating temperature, typically including depressed friction mode reaction forces at low temperatures accompanied by relatively high resilient deformation reaction forces.

A related prior art problem involves the occurrence of irregular reaction force peaks or "spiking" at the beginning of the shock absorbing stroke, which may result in reaction force values greater than the tolerable maximum value. The peaks are believed to reflect the failure to check the relatively high static friction values of the elastomeric member with the adjacent shock absorber friction surface, as well as the failure to establish a uniform friction interface.

A further prior art problem is the phenomenon of reverse velocity sensitivity wherein the reaction force varies inversely with the impact velocity. This results in the energy of a low velocity impact loading being absorbed in a relatively short stroke with a high reaction force, while an increased velocity loading requires a disproportionately increased stroke, since the maximum reaction force generated primarily by friction is decreased. The disadvantages of such a device are readily apparent.

Lastly, the prior art devices did not control the resilient deformation of the elastomeric member to the degree necessary to avoid premature failure due to the high stresses which accompany fold in a compressive-buckling mode of resilient deformation, and to assure returnability of the unit after impact. Further, the availability of additional friction reaction forces during the resilient deformation of the elastomeric member has not been previously utilized to increase the overall energy absorbing capacity and assure a substantially constant total reaction force.

To summarize, the present invention provides a multiple mode method and apparatus for absorbing shock impact energy wherein an elastomeric member is used. The elastomeric member provides additive, simultaneous controlled friction and resilient deformation reaction forces. Upon impact loading, the total reaction force is substantially constant throughout the period of energy absorption and it is substantially independent of operating temperature. Further, the level or absolute value of the constant reaction force generated primarily by friction may be rendered substantially independent of or directly proportional to the impact velocity in accordance with teachings of the present invention.

In the illustrated embodiment, the elastomeric member has a cylindrical sleeve or tube shape. The elastomeric member is mounted within a cylindrical casing or housing having a restricted portion which cooperates to define a friction interface with the outside surface of the elastomeric member and to provide frictional reaction forces proportional to the area of the interface as the elastomeric member is advanced upon impact. As the elastomeric member is frictionally advanced out of the restricted portion so as to decrease the frictional reaction forces, it is received within a relatively enlarged portion of the casing wherein it is confined to generate increasing resilient deformation and compressive reaction forces. In this manner, the frictional reaction forces are decreased and the resilient deformation or compression reaction forces are simultaneously increased so as to inversely relate the reaction force modes through the stroke of the shock absorber.

It has now been discovered that the preloading of the elastomeric member significantly increases the efficiency of the shock absorbing technique or the square wave approximation of its force-deflection curve. The preload results in the radial expansion of the elastomeric member and a direct means of closely controlling the effective area of the friction interface, as well as the rate at which the frictional reaction forces are developed.

The precise mechanism of preload in a friction shock absorbing device is not completely understood, but it has been found to substantially eliminate the temperature performance variations of prior art devices. To the degree that it compensates for the problems attributable to variances in the coefficients of thermal expansion of the elastomeric member and associated shock absorber friction surface, it is believed that the preload establishes an initial friction interface condition of increased elastomer contact which is not significantly altered with respect to operational performance by substantial temperature variations.

The provision of a uniform friction interface is exemplified in the illustrated embodiment by the use of an organic coating primarily comprising a phenolic resin having graphite dispersed therein on the inside friction surface of the restricted portion of the shock absorber casing, as well as the inside surface of the enlarged portion thereof. The organic coating results in a surface of uniform lubricity which facilitates the achievement of a maximum, constant frictional reaction force value. In addition to the use of organic coatings, metal plating techniques and polishing techniques for treating the inside surface of the casing have also been found to provide acceptable results. The coating, plating or polishing techniques generally result in the desired uniform lubricity and surface roughness, and tend to alter the absolute values of the frictional reaction forces. A further practical advantage of such techniques is the mitigation of elastomer abrasion and the attendant improvements in reproducibility of performance as well as cycle life values.

The prior art problem of "spiking" is directly eliminated in the illustrated embodiment by the provision of flats along outside surfaces of the elastomeric member. Further, the improved friction interface of the present invention is also believed to contribute to the elimination of the prior art spiking problems. In this regard, the reduction in the coefficient of friction under sliding conditions and the effective use of preload are considered to be particularly pertinent.

The reverse velocity sensitivity of prior art devices has also been eliminated in accordance with the subject invention. The imposition of preload on the elastomeric member has been found to result in a substantially constant total reaction force through the desired range of impact velocities. The total reaction force tends to correspond to the higher values obtained at low velocities in the prior art devices. This is not a design limitation, since the magnitude of this total reaction force can be altered by the foregoing lubricity techniques.

In addition to eliminating the prior art reverse velocity sensitivity problems, the present invention also enables the provision of direct velocity sensitivity wherein the frictional reaction force level increases with impact velocity. In direct velocity sensitivity, a constant friction reaction force level is displayed during the period of energy absorption at a given impact velocity and, upon an increase in the impact velocity, the friction reaction force level also increases to a proportionally higher and constant value. In accordance with the present invention, direct velocity sensitivity is achieved by use of the metal plating and polishing techniques referred to above in combination with comparatively lower axial preload values including the complete elimination of preload.

The provision of a velocity sensitive device tends to minimize the shock loading, rebound and fatigue of the shock absorber supporting structure. In applications wherein two relatively spaced shock absorbers are used to support a rigid member, velocity sensitive absorbers tend to stroke more uniformly, especially during off-center impacts of the rigid member.

The resilient deformation of the elastomeric member of the present invention is aptly described as controlled or limited compressive-buckling wherein the fold aspect of buckling has been restricted to a wave-like deformation. The wave deformation is desirable, since it does not impose small radius curvatures and high stresses upon the elastomeric member, which tend to fatigue the elastomer and cause premature failure. In contrast with prior art devices and techniques, the elastomeric member is structurally confined to a relatively greater degree in order to eliminate the small radius folds of compressive-buckling during the resilient deformation mode. This results in a further advantage to the overall energy absorbing aspects, since additional friction reaction forces are generated during the resilient deformation or compressive-buckling of the elastomeric member, as will become more apparent hereinafter.

The method and apparatus of the present invention are useful in a broad range of applications wherein it is necessary to absorb shock impact loads, as indicated by the foregoing discussion. The illustrated embodiment and following description are directed to a shock absorber designed for interposition between an automotive chassis and bumper which represents one of the many uses of the present invention.

For a better understanding of the present invention, together with other and further objects thereof, reference is had to the following description taken in connection with the accompanying drawings, and its scope will be pointed out in the appended claims.

Figures 1, 2, 2A, 3:
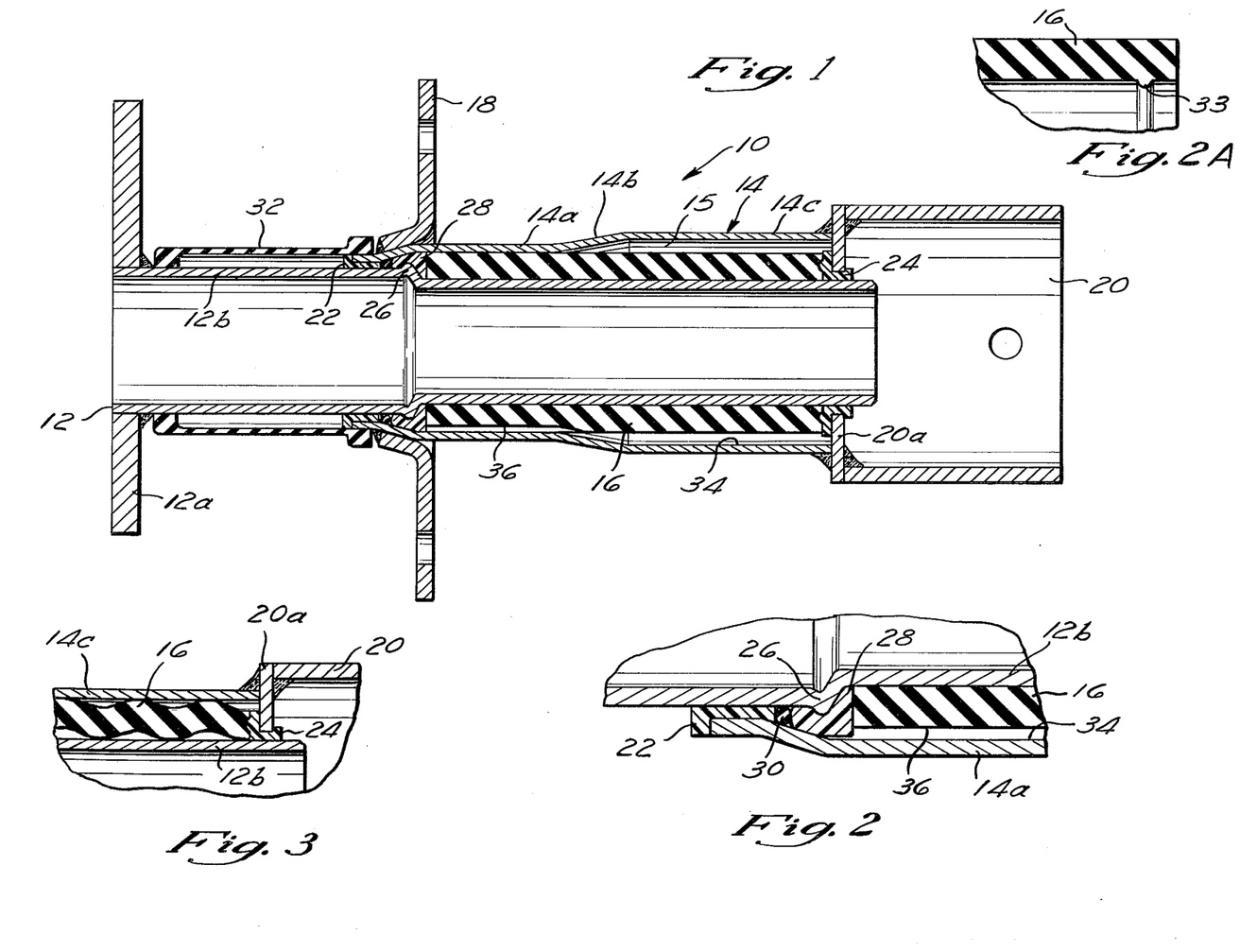
FIG. 1 is a sectional view of a shock absorbing device in accordance with the present invention.
FIG. 2 is a fragmentary sectional view on an enlarged scale, showing the details of the mounting of the forward end of the elastomeric sleeve in the shock absorber device of FIG. 1.
FIG. 2A is a fragmentary elevational view on an enlarged scale showing the details of the rearward end of the elastomeric sleeve shown in FIG. 1 in an unrestrained condition.
FIG. 3 is a fragmentary, diagrammatic, sectional view illustrating the resilient deformation of the elastomeric member of the shock absorber of FIG. 1.

Referring to FIGS. 1 and 2, there is shown a shock absorber 10 which employs multiple mode frictional and resilient deformation reaction forces to resist impact loading. The basic components of the shock absorber 10 include an impact receiving member or piston 12, a housing or casing 14, and an elastomeric tubular member or sleeve 16. For purposes of mounting the shock absorber, a radially extending flange 18 is secured to the forward portion of the casing 14 and a bracket 20 is secured to the rearward end of the casing 14. In an automotive application, the flange 18 and the bracket 20 may be secured to the frame of an automobile (not shown) and the automobile bumper (not shown) is fixed to the head portion 12a of the piston 12.

The piston 12 is coaxially disposed within the casing 14, and it is arranged for relative axial movement therein. The piston 12 includes a generally cylindrical shaped piston rod 12b which is rigidly fixed to the piston head portion 12a.

The piston 12 is mounted within the forward portion of the casing 14 by means of a nose bearing 22 (FIG. 2) which is formed of a glass-reinforced nylon in order to provide adequate bearing strength and thermal dimensional stability. The nose bearing 22 has an annular configuration, and it resiliently snaps onto the forward end of the casing 14. The nose bearing 22 limits the radial motion of the piston rod 12b and tends to protect the elastomeric member 16 from variation in radial loading during impact. Accordingly, the nose bearing is provided with a close tolerance fit relative to the outside diameter of the piston rod 12b.

The piston 12 is supported adjacent the rearward end of the casing 14 by means of a rear bearing 24 which is also formed of a glass-reinforced nylon material for purposes of thermal integrity. The rear bearing 24 has an annular configuration and it embraces a wall 20a extending radially inward from the bracket 20. The wall 20a closes the opened rearward end portions of the casing 14 and provides a stationary support surface against which the elastomeric member 16 is biased upon impact loading.

The piston rod 12b has a peripherally extending driving rib 26 (FIG. 2) located adjacent the forward end of a reduced diameter portion thereof. The driving rib 26 cooperates with a center retainer bearing 28 to transmit impact loads to the elastomeric member 16. The bearing 28 is also formed of a glass-reinforced nylon material. The bearing 28 has a close tolerance fit with the outside diameter of the pisotn rod 12b and the inside diameter of the adjacent portion of the casing 14 in order to minimize extrusion of the elastomeric member 16 upon impact.

The bearings 22, 24, and 28 also cooperate to seal the elastomeric member 16 within the casing 14 and to maintain the interior of the casing free of contaminants, which may affect the performance of the unit. If it is desired to employ an additional seal, an O-ring 30 disposed between the nose bearing 22 and the bearing 28 may be used.

A flexible rubber boot seal 32 is resiliently disposed adjacent the front of the unit to seal against leakage. The boot seal 32 is a dynamic seal in that it remains functional during the stroking of the shock absorber. Referring to FIG. 2A, an integrally molded O-ring seal 33 is provided about the inside circumference of the elastomeric member 16 adjacent the rearward end thereof. The seal 33 maintains a fluid tight seal with the outside surface of the piston rod 12b.

The casing 14 includes a restricted or reduced diameter portion 14a, an outwardly flared portion 14b and a relatively enlarged inside diameter portion 14c. The restricted portion 14a of the casing frictionally engages the elastomeric member 16 upon impact to provide frictional reaction forces. As discussed in greater detail below, the inside surface of the casing 14 has a phenolic resin coating 34 which cooperates with the outside surface of the elastomeric member to provide a friction interface of uniform lubricity and roughness.

The frictional reaction forces are independent of the normal force between the surfaces after a predetermined normal force value is achieved upon impact. Thus, the frictional reaction forces developed in the restricted portion 14a are believed to essentially be a function of the product of a coefficient of friction and the surface contact area. Accordingly, the frictional reaction forces developed in the portion 14a linearly decrease as the elastomeric member 16 is axially advanced into the enlarged portion 14c of the casing 14.

As the elastomeric member 16 is frictionally advanced, it undergoes a limited, wave-like form of compressive-buckling within the enlarged portion 14c of the casing, as shown in FIG. 3. As indicated in greater detail below, the resilient deformation reaction forces within the enlarged portion 14c are supplemented by additional or secondary frictional reaction forces generated by virtue of frictional sliding engagement between the adjacent surfaces of the elastomeric member 16 and those of the casing and piston rod.

As indicated above, the resilient deformation mode essentially comprises compressive-buckling which is limited to a wave-like deformation. Accordingly, it is necessary to maintain a proper balance between the inside diameter of the enlarged portion 14c of the casing, the outside diameter of the elastomeric member 16 and its wall thickness, and the relative length of the casing and the elastomeric member. The ratio of the outside diameter of the elastomeric tube to the inside diameter of the portion 14c is believed to be a highly important factor in assuring the desired wave-like deformation. Satisfactory results have been obtained for elastomeric members having wall thicknesses equal to about 0.32 inch when the foregoing ratio was maintained at a value of about 0.86.

The casing 14 cooperates with the piston rod 12b, the wall 20a, and the bearings 24, 28 to define a variable volume chamber 15 for receiving the elastomeric member 16 in the resilient deformation mode. As the elastomeric member 16 is deformed to the wave-like configuration, increasing surface portions of the elastomeric member frictionally engage the inside surface of the enlarged portion 14c of the casing to provide increasing secondary frictional reaction forces.

It is also desirable that the volume of the chamber 15 which remains available to receive the elastomeric member 16 upon the full stroke of the piston member be at least equal to the volume of the unrestrained elastomeric member with some allowance for packing efficiency. For example, if the particular unit is designed to cause the piston member 12 to advance the bearing 28 to the rearward edge of the flared portion 14b at full stroke, the remaining volume of the chamber 15 as defined by the bearing 28, the inside surface of the enlarged portion 14c, the wall 20a and bearing 24, and the outside surface of the piston rod 12b should be slightly greater than the volume of the elastomeric member as measured when the latter is in an unloaded or unrestrained condition. In this regard, satisfactory results have been obtained when the remaining available volume is approximately 5% greater than the sleeve volume.

The elastomeric member 16 has a generally tubular configuration, and that portion of the elastomeric member which is disposed within the restricted portion 14a of the casing is provided with six axially extending flats 36 which are evenly spaced about its circumference. In FIG. 1, the lower half of the section of the elastomeric member has been rotated so as to illustrate one of the flats 36 and the depth of the flat has been exaggerated for purposes of clarity. The flats are approximately ¾ inch wide and they are spaced from one another by arcuate portions of the member 16. The flats 36 provide radial space or volume within the restricted portion 14a for receiving deformed elastomeric material and they have been found to effectively eliminate prior art spiking problems.

If the flats are omitted, spiking may be reduced to acceptable levels by adjusting the amount of the axial preload applied to the elastomeric member 16. For example, an elastomeric member having an unrestrained axial length equal to 6.35 inches and provided with flats is axially preloaded or initially compressed upon assembly from about 0.550 inch to about 0.700 inch and preferably about 0.600 inch for optimum performance over a temperature range of −20° F to 180° F. A similarly sized elastomeric member without flats is preloaded or compressed from about 0.300 inch to about 0.500 inch and preferably about 0.350 inch for optimum performance over the same temperature range. The preload is axially applied to the elastomeric member by providing it with an axial length in an unrestrained condition greater than the axial length it is disposed within in the assembled shock absorber.

As indicated above, the absolute value of preferable preload levels is related to the geometric configuration of the particular elastomeric member and desired operating temperature range. The preload compression length (e.g. the axial length which the elastomeric member is compressed upon assembly of the unit) and the corresponding preload force in pounds are set forth in Table I below for a number of different preload compression lengths. The force values were obtained by assembling a shock absorber identical to that of the illustrated embodiment and imposing the indicated preload compression length. The corresponding force value was measured after an equilibrium period of about two minutes following assembly at a temperature of 75° F. It should be appreciated that the force value corresponding to a given compression length will vary with temperature and it will ultimately tend to reflect any set assumed by the elastomeric member.

TABLE I

| Preload Compression Length (inches) | Preload Force (lbs.) |
|---|---|
| 0.15 | 175 |
| 0.30 | 340 |
| 0.45 | 475 |
| 0.60 | 1550 |

It has been found desirable to size the unassembled components so as to provide a slight clearance of about 0.050 inch between the inside diameter of the elastomeric member 16 and the outside diameter of the piston rod 12b in order to facilitate the return of the shock absorber to its initial position by means of the stored impact energy. To this end, a friction reducing coating may also be applied along the outside surface of the piston rod 12b.

The empirically determined preload and diametrical clearance conditions noted above are believed to result in less than complete surface contact between the outside surface of the elastomeric member 16 and the inside surface of the restricted portion 14a of the casing prior to the further radial expansion occurring upon impact of the shock absorber. In this context, complete surface contact is intended to refer to the friction interface condition which occurs upon applying to an elastomeric surface the minimum level of normal force required before it displays a constant friction reaction force which is independent of further increases in normal force. The preload forces are utilized to approach complete surface contact in the friction interface so that even at relatively low operating temperatures, complete surface contact and maximum frictional reaction force quickly develop upon impact loading. In this manner, the maximum frictional reaction force is rapidly developed at all temperature conditions in order to approach square wave efficiency.

The practical limitation upon the amount of preload is the requirement that the shock absorber return to its initial position after impact loading. Accordingly, the preload forces should not alone result in maximum frictional reaction forces, since this will prevent the return of the shock absorber by means of the stored impact energy in that a significant portion of the impact energy is dissipated in the form of heat.

The elastomeric member 16 may be formed of a wide variety of elastomeric compounds including natural rubber and synthetic materials having as their major component polybutadiene rubber and styrene copolymers thereof, ethylene-propylene rubber, polyisoprene rubber, butadiene-acrylonitrile rubber, polyurethane rubber, chlorinated and chlorosulfonated ethylene rubber, and silicone rubber. It is preferable that the elastomeric material have a glass transition temperature lower than −40° F in order to assure return at low temperatures, and a room temperature hardness (Shore Durometer A) greater than 50. These physical properties may be obtained in the foregoing elastomeric compounds by means of known compounding techniques. Of course, it is also desirable that the elastomeric material have a low permanent set and display good abrasion resistance. The elastomeric member 16 is a polybutadiene rubber compound.

As indicated above, the provision of a friction interface having a uniform lubricity and roughness is provided in the illustrated embodiment by means of the phenolic resin coating 34 which extends over the entire interior surface of the casing 14. In addition to phenolic resins, other thermosetting resins, including epoxies, polyurethanes, polyesters, and acrylics, have been found to provide satisfactory results. In addition, friction establishing and surface topography modifying additives such as $MoS_2$, Teflon, graphite, silica, glass beads, and powdered metals have been incorporated in the resin materials to provide the desired performance effects. For example, the incorporation of $MoS_2$, graphite, and Teflon to the phenolic resins has resulted in increases in force levels as compared with the performance of the phenolic coating alone. The phenolic resin coating 34 comprises a 50:50 mixture of phenolic resin and graphite.

In addition to organic coatings, metal plating techniques have been used to provide the required uniform lubricity. The use of nickel and chromium platings have each resulted in significantly increased reaction force levels in contrast with the reduced levels obtained upon using organic coatings. It has also been found that polishing the interior surface of the casing 14 will also result in the desired uniform friction interface and increased reaction force levels.

Figure 4:
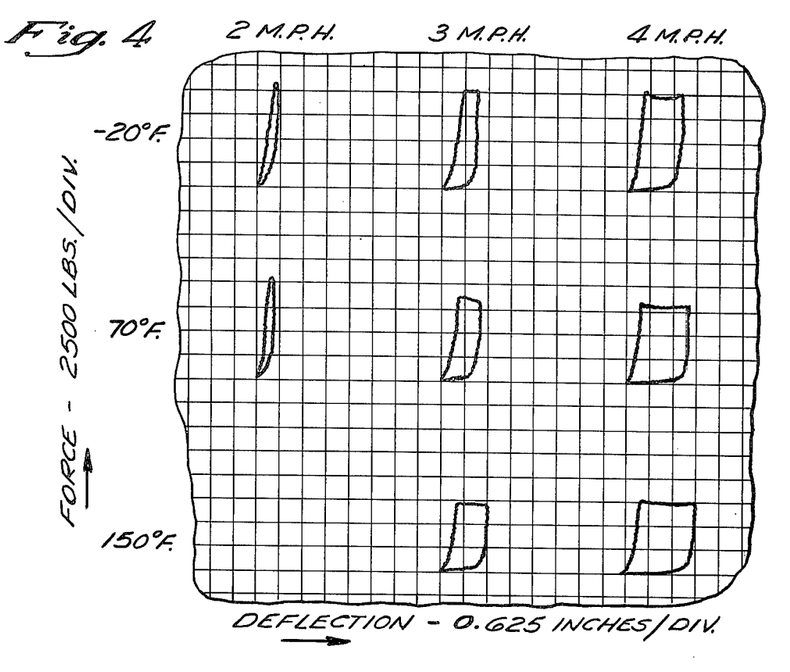
FIG. 4 is a diagrammatic reproduction of actual test results as displayed by an oscilloscope read-out device upon impacting a shock absorber empbodying the teachings of the present invention with a 2100-lb. mass at the indicated velocities and temperatures.

Referring to FIG. 4, actual test results are graphically depicted for purposes of illustrating the substantially constant reaction force, independent of temperature and impact velocity, obtained in accordance with the teachings of the present invention. The shock absorber test units employed correspond in structure with the illustrated shock absorber 10 but for a slight increase in the axial length of the elastomeric member and a corresponding increase in the length of the casing. The inside surface of the casing of each of the test units was coated with a phenolic resin having graphite dispersed therein in equal parts by weight.

The tests were performed by impacting a 2100-lb. mass against the impact receiving piston member of the rigidly mounted shock absorber at the indicated velocities and temperatures. As indicated above, the illustrated embodiment of the shock absorber is designed for automotive usage, and the temperature and impace velocities ranges were accordingly selected.

As shown in FIG. 4, the reaction forces are substantially constant and independent of impact velocity. Further, the reaction forces are substantially independent of temperature but for a slight reduction occurring at relatively high temperatures. In all cases, the initial slope of the force-deflection curves is relatively steep, indicating that complete surface contact is being rapidly developed in the restricted portion of the shock absorber. Further, the efficiency of square wave energy absorption is approximated, although sufficient impact energy is not developed at 2 m.p.h. to clearly illustrate the same.

Figure 5:
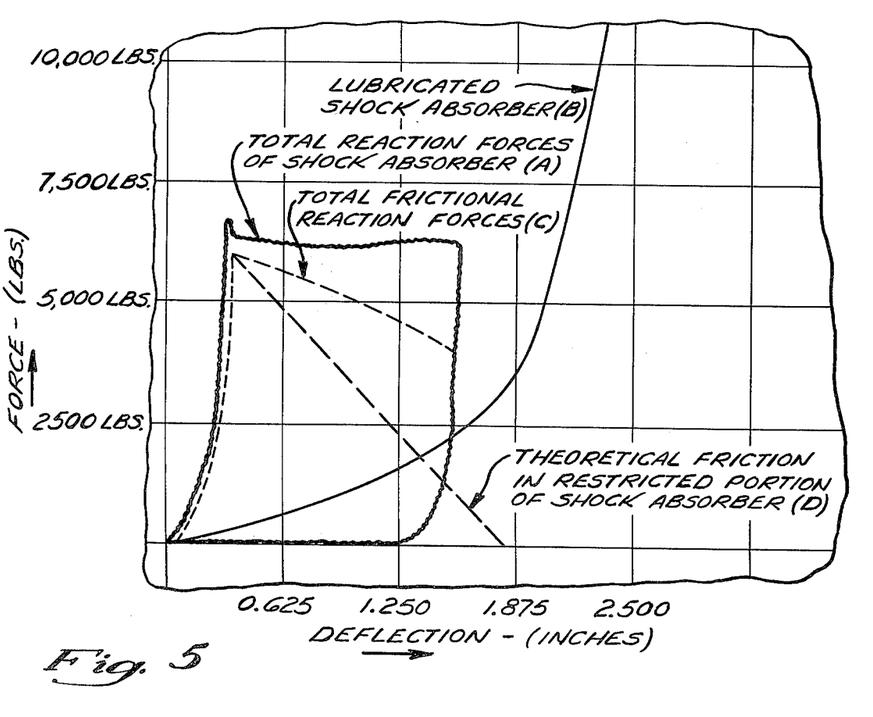
FIG. 5 graphically depicts the approximate isolation of frictional and resilient deformation reaction forces in a shock absorber in accordance with the present invention.

Referring to FIG. 5, Curve A depicts the total reaction forces of a slightly modified shock absorber in accordance with the present invention upon impact with a 2100-lb. mass at 70° F and a 3 m.p.h. velocity. In this instance, the shock absorber structure has been modified so as to omit the axially extending flats. (As indicated above, a relatively minor amount of spiking occurs upon omission of the flats, but the level of the same is well within acceptable limits.) Further, the friction interface coating did not include graphite and it was formed solely of a phenolic resin.

In order to isolate the resilient deformation reaction forces, an identically structured shock absorber was lubricated with water and impacted in an identical manner. The resulting force-deflection Curve B has been superimposed on Curve A. The total frictional reaction forces may be graphically obtained by subtracting Curve B from Curve A so as to result in Curve C. The total frictional reaction forces represented by Curve C include the additive total of the frictional reaction forces developed in both the restricted portion and enlarged portion of the shock absorber. The theoretical frictional reaction forces developed in the restricted portion of the shock absorber or the primary frictional reaction forces are graphically demonstrated by Curve D, which is obtained by connecting the point at which a constant reaction force commences (ignoring the spiking) and a reaction force value represented by a deflection corresponding to the axial length of the restrictive portion of the casing.

The secondary frictional reaction forces developed within the enlarged portion of the casing increase through the stroke of the shock absorber and the energy which they absorb is graphically approximated by the area between Curves C and D. The increasing level of secondary frictional reaction forces within the enlarged portion of the casing is attributable to the increased surface contact therein as the wave-like deformation and compaction of the elastomeric member proceeds. Accordingly, the wave-like resilient deformation of the elastomeric member is advantageous, since it not only stresses the elastomer to a lesser degree, but also results in increasing frictional reaction forces being generated within the enlarged portion of the casing.

As shown in FIG. 5, the secondary frictional reaction forces developed within the enlarged portion of the shock absorber casing significantly contribute to the total reaction forces developed by the shock absorber. Aside from the additional energy absorbing capacity, this contribution is also desirable since the frictional reaction forces are more readily controlled, and less sensitive to operating temperature changes as compared with resilient deformation reaction forces.

Figure 6:
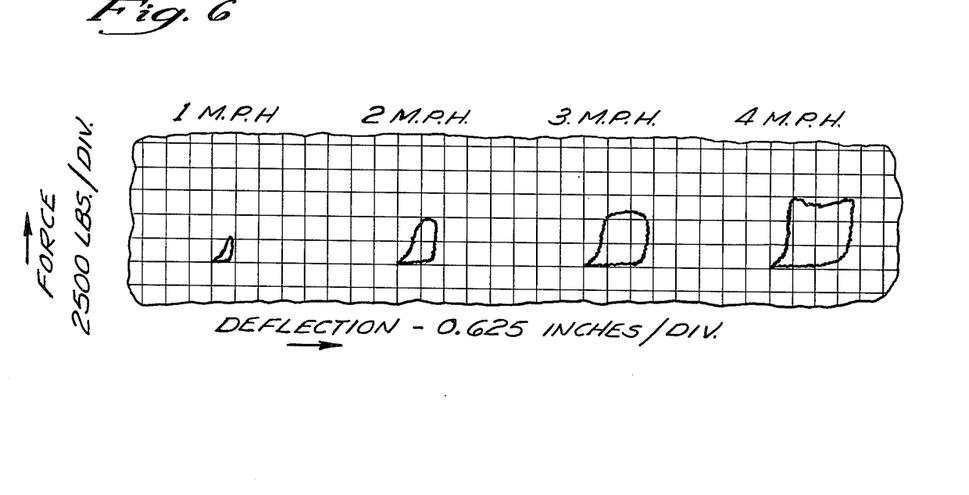
FIG. 6 is a diagrammatic reproduction similar to FIG. 4 of actual test results obtained upon modifying a shock absorber to provide direct velocity sensitivity in accordance with the present invention.
Figure 7:
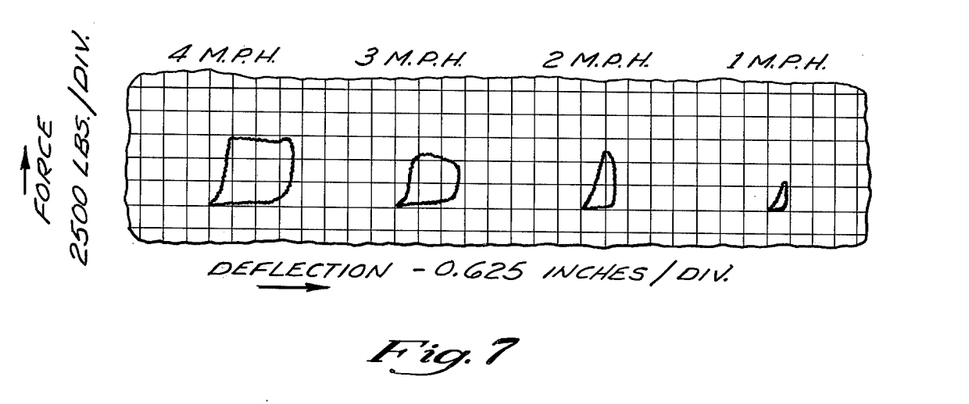
FIG. 7 is a diagrammatic reproduction similar to FIG. 6 of test results obtained upon impacting a shock absorber arranged to provide direct velocity sensitivity with decreasing velocity impact loads.

Referring to FIGS. 6 and 7, actual test results are graphically depicted for two shock absorber units modified to provide direct velocity sensitivity in accordance with the present invention. In this instance, the friction interfaces of the shock absorbers include a nickel plating on the inside surface of the casing for purposes of providing direct velocity sensitivity and a phenolic resin coating on the outside surface of the piston rod to facilitate return. In order to enhance the direct velocity sensitivity response, a comparatively lower axial preload is provided by axially compressing the elastomeric members about 0.150 inch upon assembly of the units. Preload is also effective herein to provide the advantages previously discussed even though the relative preload values are reduced in this instance.

The elastomeric members of these units do not include flats, and they each have an unrestrained length equal to 6.10 inches. The elastomeric members are formed of a polybutadiene material. In all cases, a 2100 lb. mass was impacted against the rigidly mounted shock absorber at 70° F and at the indicated velocities. The test velocities in FIG. 7 were imposed in decreasing order as depicted.

The phenomenon of direct velocity sensitivity is believed to be attributable to the use of metal plating or polished metal surfaces to provide the friction interface in combination with relatively reduced preload values. The degree of direct velocity sensitivity is affected by the magnitude of the axial preload, and it has been observed that increasing preload values tend to depress the degree of sensitivity and increase the absolute value of the frictional reaction force response. For example, the described nickel plated units display the highest degree of sensitivity with substantially no preload and acceptable degrees of sensitivity at preload values up to about 0.200 inch. The described units become constant reaction force devices at preload values greater than about 0.300 inch. As previously indicated, similar results are obtained by forming the friction interface with a chromium plate as well as by the polishing of steel.

In contrast with prior art teachings, the method and apparatus of the present invention more effectively control and efficiently utilize frictional reaction forces in a multiple-mode system.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In an elastomeric spring and frictional dampening shock absorber of the type wherein an elastomeric member is loaded and relatively displaced by a movable member to provide additive, simultaneous frictional reaction forces and resilient deformation reaction forces through the stroke of said movable member the improvement comprising;
    a. friction interface means for controlling the maximum frictional reaction force at a substantially constant predetermined value,
    b. preload means for maintaining a predetermined minimum loading of said elastomeric member,
    c. force relating means for inversely relating said friction reaction forces and said resilient deformation forces and for providing a substantially constant additive total of said reaction forces through a predetermined stroke of said movable member, said force relating means comprising primary friction means including a surface portion engaging said elastomeric member in sliding relationship to provide frictional reaction forces proportional to the area of engagement therebetween, said surface portion and elastomeric member being arranged to progressively move out of engagement upon impact loading of said movable member to provide corresponding decreases in the frictional reaction forces, confining means for receiving said elastomeric member as it moves out of engagement with said surface portion and providing increasing resilient deformation reaction forces by constraining said elastomeric member in compressive-buckling deformation through the predetermined stroke of said shock absorber, and
    d. all of said means cooperating in response to the completion of impact loading to permit restoration of said movable member to its initial position by use of the energy stored in the shock absorber during its loading.

2. A shock absorber as set forth in claim 1 wherein said preload means include biasing means for loading said elastomeric member in a direction parallel with the direction of movement of said movable member.

3. A shock absorber as set forth in claim 1 wherein said surface portion of said primary friction means has an arcuate configuration and said elastomeric member has a correspondingly, arcuate shaped surface portion engaged in sliding relationship therewith.

4. A shock absorber as set forth in claim 3 wherein said arcuate shaped surface portion of said elastomeric member includes at least one flat.

5. A shock absorber as set forth in claim 1 wherein said confining means include secondary friction means for providing increasing secondary frictional reaction forces as said elastomeric member is constrained within said confining means.

6. A shock absorber as set forth in claim 1 wherein said confining means comprise a rigid walled, variable volume chamber defined by said shock absorber, and said secondary friction means comprise wall surfaces of said chamber engaging said elastomeric member in sliding relationship as it is received therein to provide said secondary frictional reaction forces.

7. A shock absorber as set forth in claim 6 wherein said chamber has a generally cylindrical shape and said elastomeric member has a generally tubular shape, and the ratio of the outside diameter of said elastomeric member to the inside diameter of said chamber is in the range of from about 0.8 to about 0.9.

8. A shock absorber as set forth in claim 7 wherein the minimum volume of said chamber is at least equal to the volume of said elastomeric member in an unrestrained condition.

9. A shock absorber as set forth in claim 1 wherein said friction interface means comprises a surface of uniform lubricity in contact with said elastomeric member.

10. A shock absorber as set forth in claim 9 wherein said surface of uniform lubricity is provided by a thermosetting organic resin material.

11. A shock absorber as set forth in claim 10 wherein said resin material has friction modifying additives dispersed therein.

12. A shock absorber as set forth in claim 9 wherein said surface of uniform lubricity is formed of metal.

13. A shock absorber as set forth in claim 11 wherein said metal is nickel.

14. A shock absorber as set forth in claim 1 wherein said elastomeric member is formed of a polybutadiene rubber material.

* * * * *

UNITED STATES PATENT OFFICE
CERTIFICATE OF CORRECTION

PATENT NO. : 3,948,497
DATED : April 6, 1976
INVENTOR(S) : Steven O. Luzsicza et al It is certified that error appears in the above-identified patent and that said Letters Patent are hereby corrected as shown below:

Title Page:

[75] Inventors: Steven O. Luzsicza, Huron;
Thomas L. Lovitt, Sandusky;
George W. Wight, Jr., Huron;
Paschal P. Zapponi, Cleveland;
John C. Wagner, Norwalk, all of Ohio Signed and Sealed this twenty-ninth Day of June 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,948,497
DATED : April 6, 1976
INVENTOR(S) : Steven O. Luzsicza et al It is certified that error appears in the above-identified patent and that said Letters Patent are hereby corrected as shown below:

Col. 9, line 68, between "a" and "reaction", the word --zero-- should be inserted.

Signed and Sealed this

Fourth Day of October 1977

[SEAL]

Attest:

RUTH C. MASON
Attesting Officer

LUTRELLE F. PARKER
Acting Commissioner of Patents and Trademarks